United States Patent [19]

Arends et al.

[11] 4,391,768
[45] Jul. 5, 1983

[54] METHODS AND APPARATUS FOR CURLING LIPS ABOUT THE OPEN MOUTHS OF STACKED THERMOPLASTIC CONTAINERS

[75] Inventors: Albert W. Arends; Ronald E. Henke, both of Gladwin, Mich.

[73] Assignee: Leesona Corporation, Beaverton, Mich.

[21] Appl. No.: 246,888

[22] Filed: Mar. 23, 1981

[51] Int. Cl.³ .............................................. B29C 17/00
[52] U.S. Cl. .................................... 264/285; 264/296; 264/320; 264/322; 425/384; 425/391
[58] Field of Search ............... 264/322, 320, 285, 296, 264/322; 425/391, 384, 305.1, 412, 340

[56] References Cited

U.S. PATENT DOCUMENTS

| | | |
|---|---|---|
| 3,096,546 | 7/1963 | Edwards .............................. 264/320 |
| 3,337,919 | 8/1967 | Brown .................................. 425/391 |
| 3,339,005 | 8/1967 | Brown et al. ........................ 264/322 |
| 3,355,536 | 11/1967 | Midgley et al. ..................... 264/322 |
| 3,358,331 | 12/1967 | Weber .................................. 264/292 |
| 3,561,058 | 2/1971 | Komendowski ................. 425/305.1 |
| 3,579,737 | 5/1971 | Gerber et al. ........................ 264/322 |
| 3,676,543 | 7/1972 | Gerber et al. ........................ 264/322 |
| 3,861,847 | 1/1975 | Barnett ................................. 264/322 |
| 4,048,269 | 9/1977 | Wisotzky et al. ..................... 264/25 |
| 4,287,931 | 9/1981 | Vogt ..................................... 264/25 |

Primary Examiner—Jay H. Woo

Attorney, Agent, or Firm—Learman & McCulloch

[57] ABSTRACT

A system for curling turned-in lips about the open mouths of thin walled, stacked, thermoplastic containers, having brims which extend in a return direction axially, utilizes a plurality of externally helically grooved, tubular, thermally conductive, synchronously rotated rollers equiradially spaced from a common central axis to define an annular passageway between them through which a stack of the containers pass with the brim of the containers simultaneously engaged in the grooves of the rollers. While the brims are being heated radiantly and via conduction substantially to the critical forming temperature, the brims are engaged in the transport portions of the grooves, but the peripheral side wall portions of the container are not contacted. Then the peripheral side wall portions of the containers are engaged by land portions on the rollers which maintain a controlled radial spacing between the side wall portions of the containers and the brims, and axial pressure is exerted on the brims to turn them radially inwardly in a progressive manner. Thereafter, the formed brims remain engaged in the roller grooves, with the peripheral side wall portions of the containers remaining engaged with land portions of the rollers while heat is removed from the side wall portions of the containers and the brims during continued axial transport of the containers through a cooling zone.

14 Claims, 6 Drawing Figures

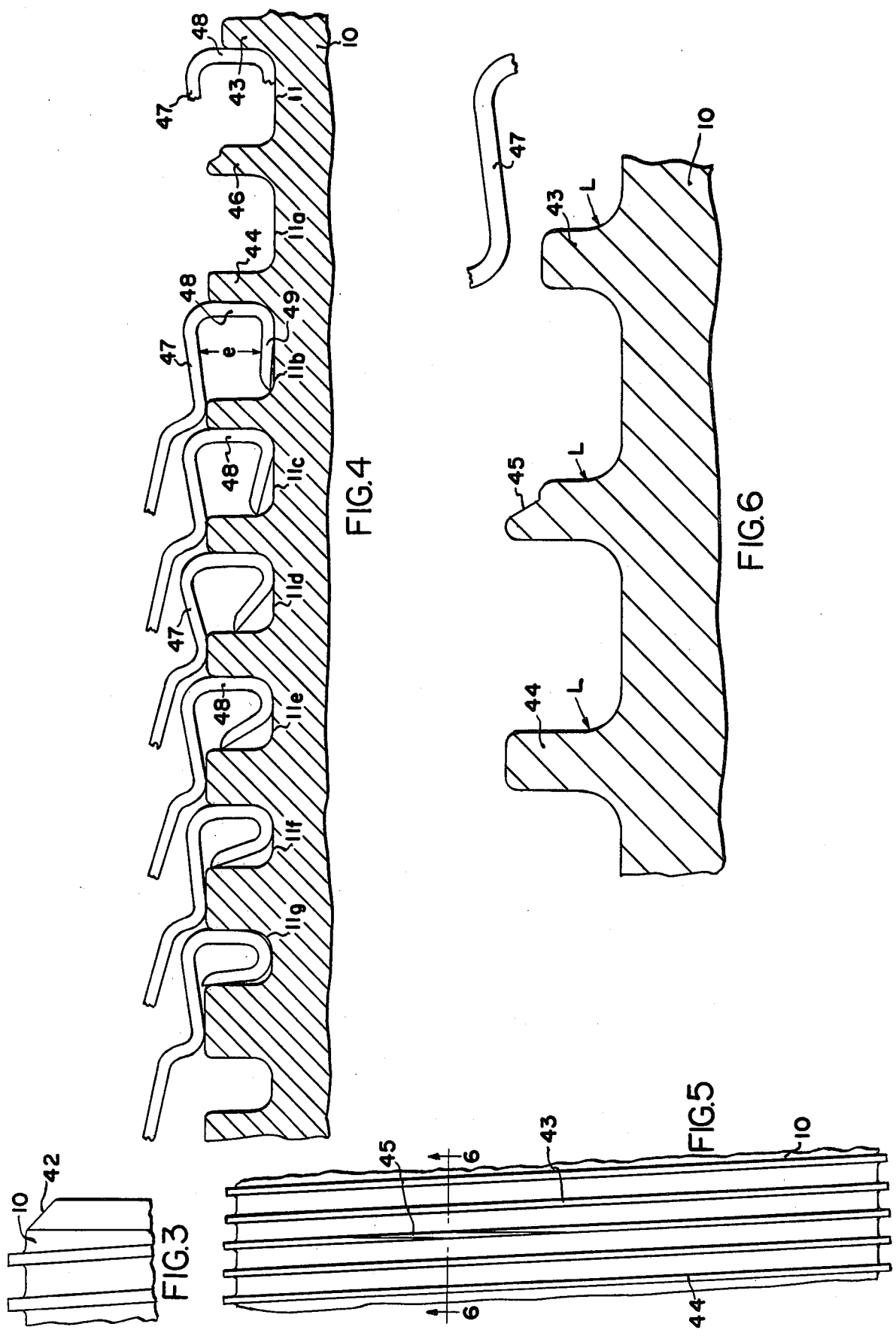

METHODS AND APPARATUS FOR CURLING LIPS ABOUT THE OPEN MOUTHS OF STACKED THERMOPLASTIC CONTAINERS

BACKGROUND OF THE INVENTION

This invention relates to methods and apparatus for curling lips about the open mouths of flexible-walled stacked containers, particularly those formed from difficult-to-process thermoplastic, synthetic plastic, material such as polypropylene. A number of systems for curling or beading the rims of thermoplastic containers have been proposed and employed over the years and are exemplified in the following patents:

U.S. Pat. No. 3,096,546
U.S. Pat. No. 3,337,919
U.S. Pat. No. 3,339,005
U.S. Pat. No. 3,358,331
U.S. Pat. No. 3,487,139
U.S. Pat. No. 3,355,536
U.S. Pat. No. 3,579,737
U.S. Pat. No. 3,676,543
U.S. Pat. No. 3,861,847
U.S. Pat. No. 3,910,744
U.S. Pat. No. 3,949,045
U.S. Pat. No. 4,048,781

While such systems have proven useful in curling the rims or brims of some plastic containers, they have not, to our knowledge, been sufficiently versatile to handle also containers formed from difficult-to-process materials such as polypropylene. While a suitable brim curling temperature for polypropylene containers may be stated to be generally in the range of 300° to 320° F., the actual range for specific polypropylene materials is normally in the area of plus or minus 5° F. within that general range. For example, with a certain batch of polypropylene which was tested, satisfactory results could be achieved if the brims, at the time of forming were held between 300° and 305° F.

With systems such as disclosed in U.S. Pat. Nos. 3,339,005 3,355,536 and 3,337,919, which employ radiant heat in advance of the forming rolls, the usual result with material such as polypropylene was that the containers were rendered too pliable to properly enter the passageway between the rolls. In other words, sufficient control of the temperature of the container side wall sections, and the temperature of the axial return (brim) sections of the containers, simply could not be achieved to permit the proficient forming of turned-in lips, when the material was a temperature-critical thermoplastic material which requires more heat input relative to surface area such as polypropylene.

Similarly, systems such as disclosed in Edwards U.S. Pat. No. 3,096,546, which utilize only internal roller heating to conductively heat container rims, could not process polypropylene containers efficiently and required rollers of undue length, which were expensive and cumbersome. In contradistinction to the methods previously suggested and commercially employed, the present system utilizes a combination of radiative and conductive heating to bring the container brims quickly, and yet in a controlled manner, to the critical forming temperature, while the rims are engaged in and mechanically supported by, the roller helical grooves. Prior to forming, the radial distance between the brim and the peripheral body wall portion at the mouth of each container is fixed and then, after forming by subjecting the brim to axially opposed pressures, heat is removed conductively by the rollers in a rim cooling zone and while the fixed radial distance mentioned continues to be maintained, until the temperature of the container and brim is lowered sufficiently so that the plastic is set in mechanically stable configuration.

One of the prime objects of the present invention is to provide a versatile apparatus which will operate on difficult-to-form materials such as polypropylene, as well as on other materials, to automatically roll in the edges on plastic containers in controlled, fast, and repetitively trouble-free manner.

Another object of the invention is to accomplish the objects of the invention with an efficient low cost machine having thermally conductive rollers which can be heated efficiently to a critical temperature and which then will form and cool the brims of stacked containers in a manner such that rollers of relatively short length can be employed, even with difficult-to-process thermoplastic materials.

Still another object of the invention is to provide a progressive curling machine of the character described which utilizes a plurality of continuous helical grooves which are capable of processing containers such as beverage cups and cottage cheese containers at higher rates of speed than previously.

SUMMARY OF THE INVENTION

Difficult-to-form materials, such as polypropylene so readily lose their rigidity upon heating that any curling of turned-in lips surrounding the open mouths of containers being formed, must be extremely carefully controlled. In the system forming the subject matter of this application which employs a combination of radiative and conductive heating to heat the brims of the stacked containers or like products, only the brims of the stacked containers have contact with the transport sections of the surrounding internally heated screws at a plurality of circumferentially spaced points, prior to the time the critical brim forming temperature is substantially reached. At that point, the screws or helically grooved rollers are configured to engage both the circumferential wall of the body of each container adjacent the mouth of the container, as well as the brim portion, to maintain a radially spaced distance therebetween while the lip curling operation is taking place. Surface supporting contact is maintained by the screws with both the container body surface and the brim of each container thereafter to maintain the same spacing, while heat is being removed from the container in a cooling zone.

BRIEF DESCRIPTION OF THE DRAWINGS

In the drawings:

FIG. 3 is a greatly enlarged, fragmentary, side elevational view of the upstream end of one of the rollers;

FIG. 4 is a greatly enlarged, fragmentary, sectional side elevational view illustrating the configuration of the helical grooves of the rollers in that portion of their length which performs the curling or forming operation;

FIG. 5 is a considerably enlarged fragmentary, side elevational view illustrating the manner in which each roller increases in diameter at the time brim heating has been substantially accomplished and curling is to occur; and FIG. 6 is a greatly enlarged cross-sectional view taken on the line 6—6 of FIG. 5.

DESCRIPTION OF THE PREFERRED EMBODIMENT

Figure 1:
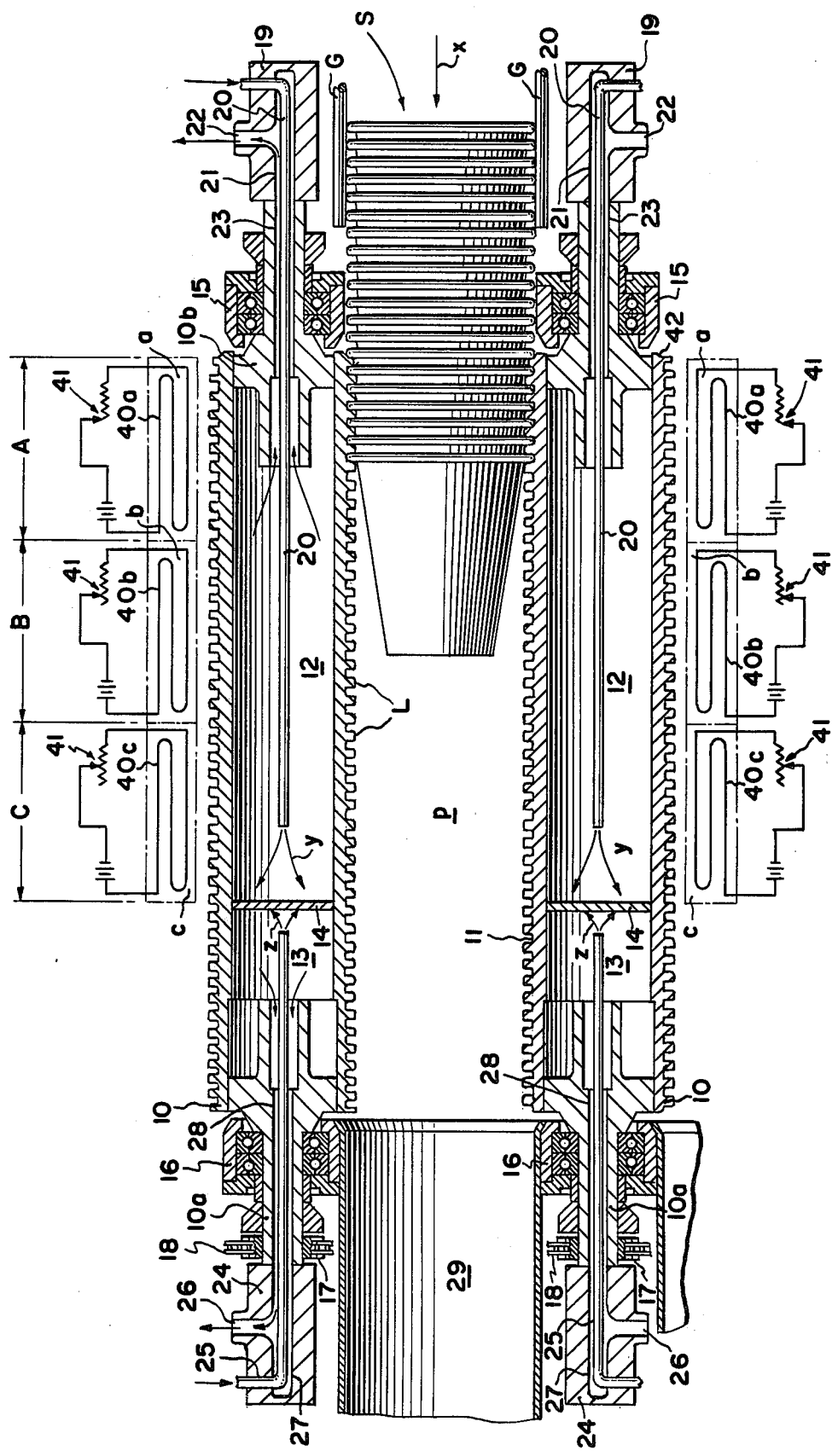
FIG. 1 is a partly schematic, sectional elevational view showing a stack of containers proceeding from right to left through the central passageway which is defined by the surrounding helically grooved rollers, the brims of the containers shown engaged in the continuous external helical grooves in the temperature controlled rollers.
Figure 2:
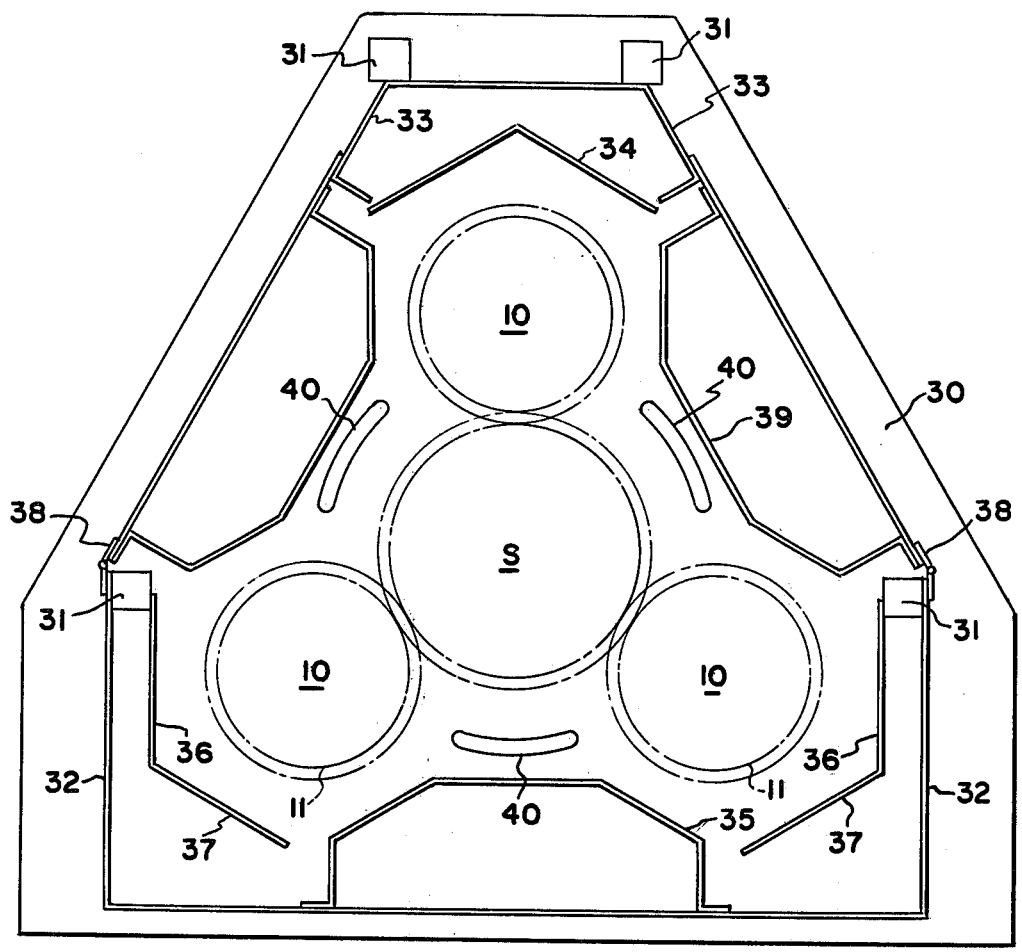
FIG. 2 is a fragmentary front elevational view thereof, with certain parts omitted and the containers indicated only in chain lines.

Referring now more particularly to the accompanying drawings, a stack of cups differential pressure formed of a thermoplastic material, such as polypropylene, is shown at S in FIG. 1 proceeding from right to left down the central passageway p which extends axially between the cup transporting rollers 10 (see FIG. 2). Each of the rollers 10 is continuously, identically, helically grooved (the groove is generally rectangular in shape) as at 11, and is hollow to provide heating and coolng chambers 12 and 13, respectively, separated by liquid-tight thermal barriers 14. The grooves 11 are of constant radial depth throughout their length. Provided to journal the rollers 10 for synchronous rotation, are bearings 15 and 16 at the upstream and downstream ends of the rollers 10, respectively, and it will be noted that sprockets 17, driven by a chain 18 connected to a suitable speed reducer—electrical motor assembly (not shown) are provided on the axially projecting stub shafts 10a anchored within each of the identically grooved rollers 10 to permit the rollers to be driven synchronously in rotation at the same rate of speed and in a common direction of rotation selected to move the stack S, via the helical grooves 11, in the axial direction indicated by the arrow x.

At the upstream end of the machine, a non-rotary coupling member 19 is sealably connected to each axially projecting tubular stub shaft 10b anchored by each roller 10 and, mounted within coupling 19, is an inlet tube member 20, within a passage 21 therein which permits the circulation of returning fluid around tube 20 so that it can egress via an exit 22. The tube 20 for each roller 10 is connected with a suitable source of heating liquid via a recirculating system, such as shown in Brown U.S. Pat. No. 2,994,514 and delivers a suitable liquid, such as hot oil at a temperature in the neighborhood of 290° F. out the end of tube 20, as indicated by the arrows y. The passage 23 provided in each of the stub shafts 10b is also of enlarged diameter relative to the tube 20 to permit the hot liquid to circulate back to the passageway 21 in coupling 19 and on to exit 22.

The rollers 10 throughout the major portions of their lengths supply heat to the brims of the containers, which in the present instant are shown as cups, by way of conducting heat directly from the heating fluid in chambers 12 through the thermally conductive walls of rollers 10 directly to the brims of the containers which are in contact with the walls of grooves 11.

A similarly sealed, non-rotary coupling 24 is provided at the downstream end of each roller 10, and includes a similar inlet tube 25, and exit port 26. The chamber 27 in each coupling 25 is enlarged relative to tube 25 in the same manner as previously, and connects with a similarly enlarged chamber 28 in each stub shaft 10a. Each tube 25 is similarly connected to a recirculating source of coolant, or to a source of coolant such as tap water at 40 to 50° F. which is discharged to a drain. The coolant liquid is delivered from the tube 25 to the chamber 13 in each roller 10, as demonstrated by arrows z, and functions to remove heat from the downstream portion of rollers 10, and thus to remove heat from the containers moving axially in the direction x beyond the thermal barrier plates 14. A central exit chute 29 is provided, out which the stack S of containers exit and, by the time the individual containers reach chute 29, they have been cooled sufficiently to be mechanically stable.

Referring now more particularly to FIG. 2, it should be appreciated that the structure described thus far is mounted within a system of enclosures surrounding rollers 10 which comprises end frames such as at 30, connected by longitudinal members 31. The members 31 support upper and lower axially extending plates 32 and 33, which in turn support upper and lower axially extending plates 34 and 35. The lower rails 31 also support axially extending lower side plates 36 and 37. Hinge members 38, connected to the members 32, support axially coextensive plate housings 39, and permit them to be swung outwardly away from the positions in which they are shown to a removed position. The plate system which has been described is designed to conform to the configuration of the roller array and the spaces between them to reflect heat back toward the rollers 10 and stack S.

Provided between the rollers 10 are radiant heater systems 40 which are situated between the rollers 10 to radiate heat directly to the stack of containers. The radiant heater systems 40 are shown schematically in FIG. 1 to each comprise a series of individually controlled heating elements 40a, 40b, and 40c embedded in a ceramic material to create radiant heat emitting surfaces a, b, and c and heating zones A, B, and C. The surface a in zone A has a surface temperature maintained in the neighborhood of 700° F., the surface b in zone B has a surface temperature maintained in the neighborhood of 600° F., and the surface c in zone C typically has a surface temperature maintained in the neighborhood of 500° F.

It has been determined that it is important to use the combination of radiative and conductive heating when processing material such as polypropylene in order to obtain the "fine tuning" necessary to bring the brims progressively to forming temperature, and no higher. By the time the forming portions of the rollers 10 are reached, if only a constant radiant heat source is used, the rims tend to be heated so rapidly that they lose their mechanical stability long before the forming is to take place. If only an internal heating procedure is utilized, it also is difficult to have the brims reach the right temperature at exactly the right time forming is to take place. With both radiant and conductive heat being applied, and multiple zones of different temperature being used axially to do the heating radiantly, the heating system can be "fine tuned" to produce the desired result. In this respect, it is to be observed that the circuits for heating elements 40a, 40b and 40c each include variable resistor controls 41, which are especially helpful in permitting the "fine tuning" to take place. Also, of course, the recirculating heating system mentioned for supplying heating liquid through tubes 20, is helpful in "fine tuning" the system.

In FIG. 3, the entrance ends of rollers 10 are shown as beveled at 42 to facilitate entrance of the stack S to the rollers, and particularly the leading cup of the stack.

Normally a belt conveyor is utilized to bring the stack to passageways p through aligning guide rods G, and is well able to introduce a stack of containers to the lead-ins 42 and passageway p without any need for an operator assisting the operation manually.

In FIG. 4, a portion of the helical groove 11 of each roller 10, which is employed for forming, is shown. The helical groove 11 remains of constant radial depth throughout the length of each roller, but the land, generally designated L, of each roller increases in radial projection from the land section 43 of least projection, which is constant from the entrance end of the rollers downstream to the location where forming is to take place, to the land section of maximum projection 44 which is maintained thereafter to the downstream ends of the rollers.

As FIG. 6 particularly indicates, there is an intermediate land portion 45 between sections 43 and 44, which through about 30 degrees of circumferential extent is of progressively increasing radial projection.

As has been indicated earlier, cups include peripheral body wall portions 47, contiguous to the open mouths of the cups, lateral portions comprising radial walls 48, and reversely turned brims or lips 49. The brims 49 tend to protect the wall portions 47 from the direct radiation emitted by radiant heater systems 40, and the land portions 43 are maintained out of surface contact with the container peripheral wall portions 47 until such time as forming is about ready to take place, so as to maintain the mechanical stability of the wall portions 47 and prevent them from sagging radially toward the lip portions 49. Nevertheless, these wall portions 47 will, of course, absorb heat from the portions 48 and 49. It is the lip or brim portions 49 which receive the full combined radiant and conductive heat imparted. At the time the lips 49 are substantially at a proper temperature for forming, the land L projection has increased so that land portions 44 will be in engagement with the container body wall portions 47 and a positive radial spacing e can be maintained between the wall portions 47 and the lip portions 49. Thereafter the axial width of the grooves 11 is progressively decreased, as shown in FIG. 4, and while wall portions 47 remain supported (the grooves of progressively decreasing width being indicated at 11a through 11g). Thereafter in a downstream direction, the groove portions 11 of each roller remain at the axial width 11g. Stated another way, the land L of each roller 10 increases gradually in width from 11a to 11g until it assumes a constant width in the cooling section of the machine, and during cooling, which commences at the time chamber 13 is reached, the lands L remain in engagement with and support the body wall portions 47 of the cups or containers. The rollers 10 in effect increase in diameter to provide land portions 44 which maintain the spacing e between the cup portions 47 and 49 when that need is critical. As noted, the wall portions 47 continue to be supported during the cooling cycle until such time as they become mechanically stable. They do not cool as fast as the portions 48 and 49 of the brim which are in contact with the rollers 10, and from which heat is being removed more rapily because of the greater surface contact. Maintenance of some contact between the land portions 44 and the walls 47 does, however, permit some heat to be removed from the portions 47 and the progressive cooling takes place until mechanical stability is reached.

While we have particularly mentioned polypropylene, it is to be well understood that we contemplate that the machine will be versatile in nature, and fully capable of handling the processing of a wide variety of thermoplastic materials.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

We claim:

1. In rim curling apparatus for curling a turned-in lip about the open mouth of a flexible walled, annular thermoplastic container, formed particularly from difficult to curl materials such as polypropylene, which has a rim which extends radially outwardly and then axially, and which includes a plurality of generally cylindrical elongate, thermally conductive, tubular rotatable rollers, each having a continuous helical groove in its outer peripheral surface, and each being equi-radially spaced from a common central axis to define therebetween an annular passageway through which a stack of the containers pass with the rim portions of the containers engaged in the grooves of the rollers; means within the rollers, in upstream portions thereof, for heating of the rollers from within and defining an upstream length constituting a rim heating zone; and means within the rollers downstream therefrom, and thermally insulated therefrom, for cooling the rollers from within and defining a downstream length constituting a rim cooling zone; the improvement wherein: the rollers have portions of different diameter; the helical grooves in said upstream portions are of a cross-section to comprise transport sections in reduced diameter portions of the rollers which axially transport the container via their rims without engaging said peripheral side wall portions of the container; external, axially extending, radiant heater means are provided circumferentially between the upstream portions of said rollers to heat the exposed portions of the rims radiantly; the helical grooves in said downstream portions are in portions of said rollers which are of greater diameter than the upstream portions to engage and cool said side wall portions of the container; and helical groove portions of axially decreased width are provided in each roller between the transporting groove portions and the cooling groove portions to form the rims by turning the rims inwardly, the helical groove portion of axially decreased width being in portions of said rollers which are of the same diameter as the portions of the rollers which include the cooling groove portions.

2. The apparatus of claim 1 wherein said radiant heater means comprises axially contiguous sets of heater elements providing separately controlled first, second, and third heating zones, the first zone circumferentially circling the upstream container entrance ends of the rollers.

3. The apparatus of claim 1 wherein said first zone provides a surface temperature at the heater elements of about 700° F., the second zone provides a surface temperature at the heater elements of about 600° F. and the third zone provides a surface temperature at the heating elements of about 500° F.

4. The apparatus of claim 1 in which helical groove transition sections of increasing land projection radially are provided between the portions of said rollers of different diameter.

5. A method for curling turned-in lips about the open mouths of flexible, thin-walled, stacked, tapered containers formed from thermoplastic synthetic plastic material, and which have rims which extend radially outwardly from a generally axially extending peripheral side wall portion defining the open mouths of the containers with brims extending in a return direction axially, with a plurality of externally helically grooved, generally cylindrically elongate, tubular, thermally conductive, synchronously rotated rollers which are equi-radially spaced from a common central axis to define therebetween an annular passageway through which a stack of containers pass with the rim portions of the containers simultaneously engaged in the grooves of a plurality of the rollers comprising:

engaging the brims simultaneously in said grooves of the rollers at a plurality of circumferentially spaced positions and transporting the brims and containers axially while heating their brims progressively to substantially optimum deforming temperature without deforming the brims, and without engaging the said peripheral side wall portions;

then engaging said peripheral side wall portions of the containers with land portions on said rollers which furnish a substantial support for said side wall portions and maintain a controlled radial spacing between said side wall portions of the containers and brims;

exerting progressively applied axial pressure on the brims to turn the brims radially inwardly to progressively form said turned-in lips;

and continuing to keep the brims engaged in said grooves to transport the containers axially while continuing to maintain the peripheral side wall portions of the containers engaged with the land portions of the rollers, and while removing heat from the said side wall portions of the containers and brims during their continued axial transport.

6. The improvement invention defined in claim 5 wherein a continuously circulated coolant is contacted with the internal surface of said tubular rollers to remove said heat by conduction.

7. The improvement invention defined in claim 6 wherein the axial pressure which is exerted on the brims is applied by contacting the ends of the brims with the radial sides of portions of said grooves which are of progressively decreased width in an axial direction at a plurality of circumferentially spaced positions simultaneously.

8. The improvement invention defined in claim 6 wherein the heat is removed by contacting the rims with the radial sides and axial surfaces of portions of said grooves which are of substantially the width of the portions which last applied the axial pressure while continuing to transport the containers axially for a time sufficient to cool the brims and peripheral side wall portions to a mechanically stable, "set" condition.

9. The improvement invention defined in claim 8 wherein the heat is progressively applied to the rims, in part by contacting the rims with the radial sides and axial surfaces of portions of said grooves while applying controlled heat energy internally to the surfaces of said tubular rollers.

10. The improvement invention defined in claim 9 wherein the heat energy is applied internally by continuously circulating a thermally heated fluid in said tubular rollers.

11. The improvement invention defined in claim 9 wherein the heat is further progressively applied to the brims via a radially directed radiant heat zone which extends axially and applies heat to the brims at circumferential intervals.

12. The improvement invention defined in claim 11 wherein heat energy is also applied to said rollers externally by said radiant heating zone, and the amount of heat energy supplied internally is controlled to maintain the roller groove surfaces which apply heat, at predetermined temperatures.

13. The improvement invention defined in claim 11 which said zone terminates at the portions of said grooves which apply axial pressure and the internally applied heat energy is maintained to keep said brims at deforming temperature while the said axial pressure is being applied.

14. The method of claim 5, wherein separately controlled, first, second and third heating zones circumferentially encircle the containers and provide a progressively decreased heat output as the containers are advanced to the location from which heat is removed from the side wall portions of the containers and brims.

* * * * *